March 6, 1934.    M. MORRISON    1,950,033
TWO COLOR STEREOSCOPIC DEVICE
Filed April 9, 1931    3 Sheets-Sheet 1

INVENTOR.
M. MORRISON
BY
ATTORNEY

March 6, 1934.  M. MORRISON  1,950,033
TWO COLOR STEREOSCOPIC DEVICE
Filed April 9, 1931  3 Sheets-Sheet 2

INVENTOR.
M. MORRISON
BY
ATTORNEY

March 6, 1934.  M. MORRISON  1,950,033
TWO COLOR STEREOSCOPIC DEVICE
Filed April 9, 1931  3 Sheets-Sheet 3

INVENTOR.
M. MORRISON
BY
ATTORNEY

Patented Mar. 6, 1934

1,950,033

UNITED STATES PATENT OFFICE 1,950,033

TWO COLOR STEREOSCOPIC DEVICE

Montford Morrison, Montclair, N. J., assignor to Westinghouse X-Ray Company, Inc., a corporation of Delaware Application April 9, 1931, Serial No. 528,722

7 Claims. (Cl. 88—29)

My invention relates to stereoscopic devices and more particularly to a stereoscopic device for viewing X-ray pictures wherein the pictures are superimposed in two colors and a plurality of observers are enabled to simultaneously view the pictures at a distance from the device.

Stereoscopic devices are well known to the art wherein two pictures, which have been taken from separate angles are placed in front of an illuminated transparent cabinet and viewed by means of a pair of adjustable mirrors, in the nature of conventional binoculars, thus giving a superimposed effect of the two pictures. Heretofore, such devices have been limited to an individual observer or at most two observers viewing the pictures simultaneously by means of the binocular devices.

At the present time radiographic pictures produced by exposing an object to the X-radiation emanating from an X-ray tube are of the conventional black and white colors of film negatives which, when viewed stereoscopically superimposed upon each other, does not in a great many instances give a clear outline in some details of the pictures. I have found that if the pictures are given a color effect other than the conventional black and white the details are clearer when viewed stereoscopically.

It is an object of my invention, therefore, to provide a stereoscopic device wherein a plurality of observers may view pictures stereoscopically.

Another object of my invention is the provision of a stereoscopic device that may be so adjusted as to permit an individual observer to view pictures stereoscopically or a plurality of observers may view pictures stereoscopically at a distance from the device.

Another object of my invention is the provision of a stereoscopic device which may be adjusted to enable an individual observer to view pictures stereoscopically in two colors when in close proximity to said device or a plurality of observers to view pictures stereoscopically in two colors at a distance from the device and which when adjusted for an individual observer is rendered ineffective for the plurality of observers or when adjusted for a plurality of observers is rendered ineffective for an individual observer.

Figure 1:
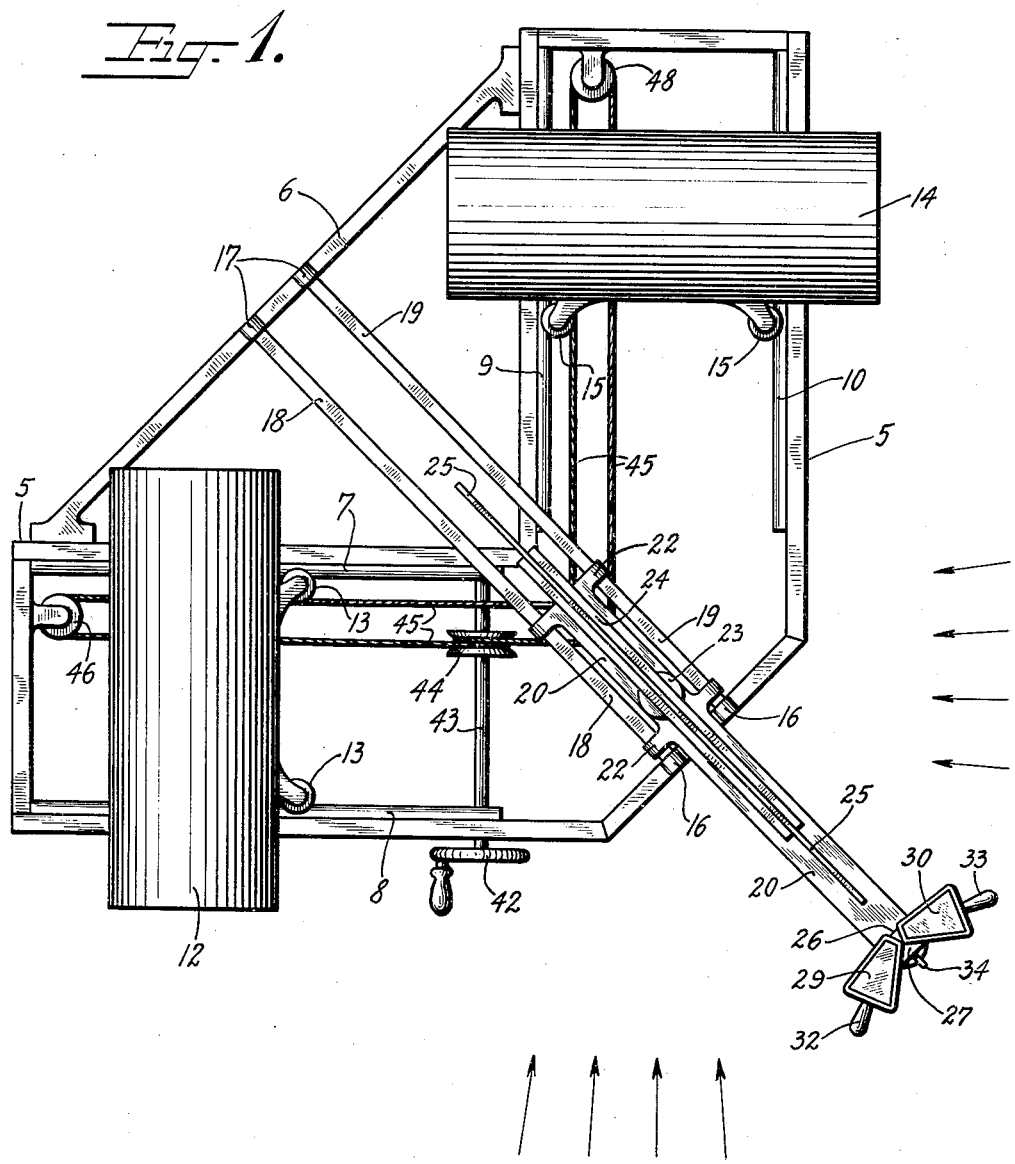
Figure 2:
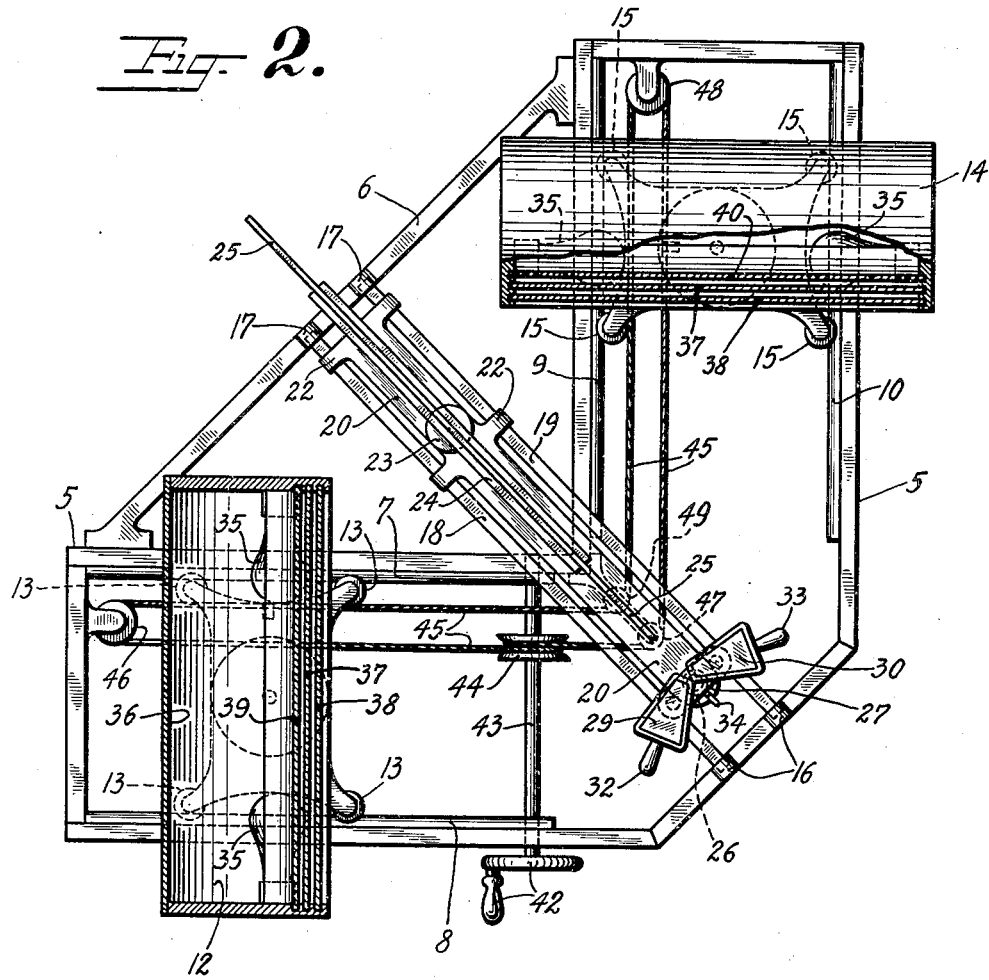
Figure 3:
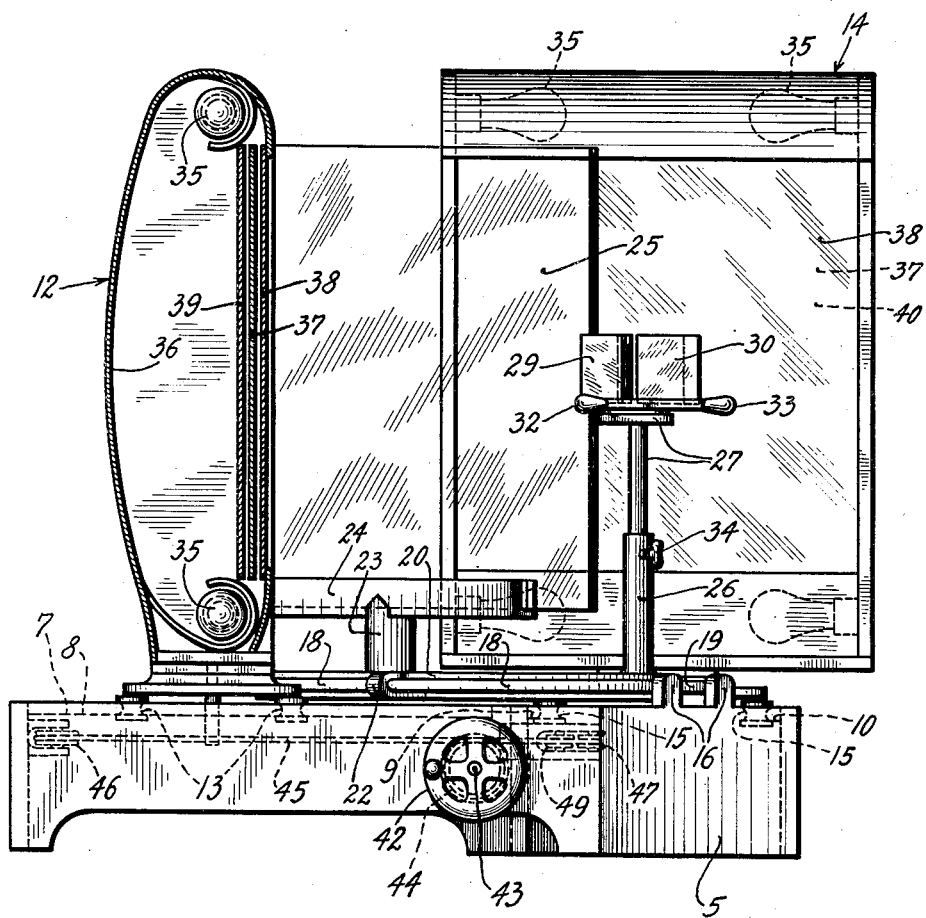

Still further objects of my invention will become apparent to those skilled in the art by reference to the accompanying drawings wherein Fig. 1 is a top plan view of my stereoscopic device showing the device in its extended position;

Fig. 2 is a top plan view partly in section showing my stereoscopic device in its inextensible position; and Fig. 3 is an elevational view partly in section of my stereoscopic device.

Referring now to the drawings in detail I have shown a main frame member 5 of a substantially L-shaped configuration and a suitable brace 6 interconnects the extremities of the frame member to make the latter a rigid construction. A pair of inwardly extending flanges forming a pair of tracks 7 and 8 are provided in one section of the frame member while a similar pair of tracks 9 and 10 are provided in the remaining section of the frame member.

An illuminated cabinet 12, provided with a plurality of rollers 13 engaging the tracks 7 and 8, is vertically supported upon one section of the frame member and a similar cabinet 14 likewise provided with a plurality of rollers 15 engaging the tracks 9 and 10 is vertically mounted upon the other section of the frame member.

A pair of upstanding lugs 16 are provided on the main frame member 5 and a similar pair of lugs 17 are provided on the brace 6. A pair of tracks 18 and 19 are secured to these respective lugs 16, 17 and are angularly disposed relative to the main frame member 5 and the cabinets 12 and 14.

An auxiliary frame 20 has a portion of its base 22 bent around the tracks 18 and 19 and is thus in extensible engagement with the main frame 5. The base of this frame is also provided near its center with a vertical lug 23 which supports a horizontally extending groove section 24 rigidly secured thereto in a suitable manner. A transparent reflecting screen 25 is arranged to rest within the grooved section 24 and move with the auxiliary frame 20 relative to the main frame 5. A vertical hollow member 26 is secured to one end of this auxiliary frame member and a supporting stem for a binocular device 27 is in telescopic engagement with this hollow member 26.

The binocular device 27 comprises a pair of lenses 29 and 30 each adjustable about a vertical axis by means of handles 32 and 33 to properly align the lenses with the cabinets. A wing nut 34 is provided in the hollow member 26, with which the binocular device is in telescopic engagement, thus enabling setting of the binocular device at the proper vertical adjustment. The cabinets 12 and 14 are each provided with a plurality of incandescent lamps generally indicated at 35 and the illumination from these lamps is reflected outwardly through the front of the cabinets by suitable reflecting surfaces 36 as shown more clearly in Fig. 3.

These cabinets 12 and 14 are each provided with the usual ground glass fronts 37 against which the X-ray negatives shown at 38 are disposed during a stereoscopic examination. A color screen shown at 39 and 40 is positioned between the source of illumination of each device and the ground glass fronts 37 and are of different color, as for example, the screen 39 of cabinet 12 may be green, while the screen 40 of cabinet 14 may be red.

A hand crank 42 extends laterally from the main frame member 5 and is connected to a shaft 43 which is journaled in the main frame member 5. A pulley 44 is rigidly secured to this shaft 43 and a chain or cable 45 is looped around this pulley and extends therefrom in one direction to an idler pulley 46 and is then connected to the illuminated cabinet 12. This cable 45 then extends around an idler pulley 47 disposed at the angle of the L-shaped frame member 5 and is then secured to the illuminated cabinet 14. From this latter cabinet 14 the cable then passes around an idler pulley 48 at the other end of the frame member, thence to a similar idler pulley 49 disposed at the angular intersection of the frame member 5 and then back to the cabinet 12. In this manner by rotating the hand crank 42 the cabinets 12 and 14 are simultaneously moved toward or away from the auxiliary frame 20.

The operation of my device is as follows: Assuming an individual observer desires to view two X-ray negatives, shown at 38, which have been taken from two distinct angles, he first lights the lamps 35, which are connected to a suitable lighting source (not shown), and moves the auxiliary frame 20 to its inextensible position as shown in Fig. 2.

The binocular device 27 is then vertically adjusted and secured at the desired height by means of the wing nut 34. The lenses 29 and 30 are then set at the correct angle relative to the cabinets 12 and 14, which support the pictures 38, by rotating the lenses by means of the handles 32 and 33 until the proper optical relation is obtained, i. e., the image appears superimposed to the observer.

The observer then dons a pair of spectacles having colored lenses corresponding to that of the color screens utilized but opposite in color with respect to the screens. That is to say, assuming the screen 39 to be green in color and that of screen 40 to be red, as shown in Figs. 1 and 2 of the drawings, the observer must utilize a red lens in front of his left eye and a green lens in front of the right eye in order to view the pictures superimposed in the two colors.

When the observer is in close proximity to the binocular device and is viewing the pictures if the focal distance or optical relation is not as yet correct he may adjust the pictures by rotating the hand crank 42 to simultaneously move the cabinets toward or away from the binocular device 27 as previously described, and thus completely obtain the correct focus and optical relation.

Assuming now it is desired to permit several observers to view the pictures simultaneously the auxiliary frame 20 is moved to its extensible position relative to the main frame 5. This positions the screen 25 angularly between the illuminated cabinets 12 and 14 and the binocular device is moved out of viewing position. All the observers then don spectacles of two colored lenses similar to those described for the individual observer and by standing at positions as indicated by the arrows in Fig. 1, a considerable number of observers can view the pictures superimposed on the screen 25 in two distinct colors.

The observers standing to the left of the auxiliary frame 20 will see the picture supported by the cabinet 12 reflected upon the screen 25 and the image supported by the cabinet 14 will be viewed directly through the screen. On the other hand observers standing at the position indicated by the arrows to the right of the auxiliary frame will view the picture supported by the cabinet 12 directly through the screen while the picture supported by the cabinet 14 will be reflected by the screen 25.

It thus becomes readily apparent to those skilled in the art that I have provided a stereoscopic apparatus for viewing X-ray pictures wherein the pictures are superimposed in two distinct colors and in one position of the device an individual may view the picture while in the other position of the device numerous observers may view the picture superimposed in two colors at a distance from the device which has not been possible with stereoscopic apparatus heretofore utilized.

Although I have shown and described one specific embodiment of my device I do not desire to be limited thereto as various other modifications of the same may be made without departing from the spirit and scope of the appended claims.

What is claimed is:

1. A stereoscopic apparatus for viewing X-ray pictures comprising in combination, a pair of picture holding devices angularly disposed relative to each other, a source of illumination for each of said devices, a color screen of a different color disposed between the pictures and the source of illumination of each respective device, a frame for supporting said holding devices, an auxiliary frame in extensible engagement with said first mentioned frame and angularly disposed relative to said holding devices, a viewing device having stereoscopic lenses carried by said auxiliary frame and positioned, when said auxiliary frame is in its inextensible position, between said picture holding devices to cause the light from corresponding parts of the pictures to be brought into coincidence upon said viewing device and to form an image which appears to be superimposed in two distinct colors to an individual observer with spectacles of corresponding two color lens when in close proximity to said viewing device and a second viewing device provided with a light transmitting reflecting surface carried by said auxiliary frame and positioned, when said auxiliary frame is in its extended position, between said picture holding devices to cause the light from corresponding parts of the pictures to be brought into coincidence upon said second viewing device and to form an image which appears to be superimposed in two distinct colors to several observers simultaneously with spectacles of corresponding two color lens at a distance from said second mentioned viewing device.

2. A stereoscopic apparatus for viewing X-ray pictures comprising in combination, a pair of picture holding devices angularly disposed relative to each other, a source of illumination for each of said devices, a color screen of a different color disposed between the pictures and the source of illumination of each respective device, a frame for supporting said holding devices, an auxiliary frame in extensible engagement with said first mentioned frame and angularly disposed between said first holding devices, a viewing device having stereoscopic lenses carried by said auxiliary frame and positioned when said auxiliary frame is in its inextensible position between said picture holding devices to cause the light from corresponding parts of the pictures to be brought into coincidence upon said viewing device and to form an image which appears to be superimposed in two distinct colors to an individual observer with spectacles of corresponding two color lens when in close proximity to said viewing device, and a second viewing device carried by said auxiliary frame comprising a screen positioned, when said auxiliary frame is in its extended position, between said picture holding devices to enable several observers to simultaneously view from a distance one of said pictures with its respective color through said screen and the other of said pictures with its respective color reflected from said screen thereby creating an image which appears to be superimposed in two distinct colors.

3. A stereoscopic apparatus for viewing X-ray pictures comprising in combination, a pair of picture holding devices, a source of illumination for each of said devices, a frame for supporting said holding devices, a color screen of a different color disposed between said source of illumination and each of said devices, and a transparent reflecting screen adjustable to an angular position between said picture holding devices to cause the light from one of said pictures to be observed through said screen and the light from the other of said pictures to be reflected by said screen thus forming an image upon said screen which appears to be superimposed to several observers simultaneously viewing said pictures at a distance from either side of said screen at an angle substantially perpendicular to the surface of either of said pictures.

4. A stereoscopic apparatus for viewing X-ray pictures comprising in combination, a pair of picture holding devices, a source of illumination for each of said devices, a color screen of a different color disposed between said source of illumination and each of said devices, a frame for supporting said holding devices, an auxiliary frame angularly disposed relative to said first mentioned frame and in extensible engagement therewith, a viewing device having stereoscopic lenses carried by said auxiliary frame and positioned between said holding device, when said auxiliary frame is in its inextensible position relative to said first mentioned frame, to cause the light from corresponding parts of said pictures to be brought into coincidence upon said viewing device to form an image which appears to be superimposed in different colors to an individual observer, and a second viewing device provided with a light transmitting reflecting surface and movable into optical position between said picture holding devices when said auxiliary frame is moved into an extended position relative to said first mentioned frame, to cause the light from corresponding parts of said pictures to be brought into coincidence upon said second viewing device to form an image which appears to be superimposed in different colors to several observers.

5. A stereoscopic apparatus for viewing X-ray pictures comprising in combination, a pair of picture holding devices, a source of illumination for each of said devices, a color screen of a different color disposed between said source of illumination and each of said devices, a frame for supporting said holding devices, an auxiliary frame in extensible engagement with said first mentioned frame and angularly disposed relative thereto, a viewing device having stereoscopic lenses carried by said auxiliary frame adjustable in a vertical plane and adjustable in a horizontal plane by movement of said auxiliary frame, said viewing device positioned between said picture holding devices, when said auxiliary frame is in its inextensible position relative to said first mentioned frame, to cause the light from corresponding parts of said pictures to be brought into coincidence upon said viewing device to form an image which appears to an individual observer to be superimposed in different colors, a second viewing device having a light transmitting reflecting surface carried by said auxiliary frame and movable into optical relation between said picture holding devices, when said auxiliary frame is moved into an extended position relative to said first mentioned frame to cause the light from corresponding parts of said pictures to be brought into coincidence upon said second viewing device to form an image which appears to several observers to be superimposed in different colors, and means carried by said first mentioned frame for simultaneously moving said picture holding devices toward or away from either of said viewing devices to adjust the focal relation therebetween.

6. A stereoscopic apparatus for viewing X-ray pictures comprising in combination, a pair of picture holding devices, a source of illumination for each of said devices, a color screen of a different color disposed between said source of illumination and each of said devices, a frame for supporting said holding devices, an auxiliary frame in extensible engagement with said first mentioned frame, a binocular device having stereoscopic lenses carried by said auxiliary frame and positioned between said holding devices when said auxiliary frame is in its inextensible position relative to said first mentioned frame to cause the light from corresponding parts of said pictures to be brought into coincidence upon said binocular device to form an image which appears to an individual observer to be superimposed in different colors, and a transparent light transmitting reflecting screen movable into optical position between said picture holding devices when said auxiliary frame is moved into an extended position relative to said first mentioned frame to cause the light from corresponding parts of said pictures to be brought into coincidence upon said screen to form an image which appears to several observers to be superimposed in different colors.

7. A stereoscopic apparatus for viewing X-ray pictures comprising in combination, a pair of picture holding devices, a source of illumination for each of said devices, a color screen of a different color disposed between said source of illumination and each of said devices, a frame for supporting said holding devices, an auxiliary frame in extensible engagement with said first mentioned frame, a binocular device carried by said auxiliary frame and positioned between said holding devices when said auxiliary frame is in its inextensible position relative to said first mentioned frame to cause the light from corresponding parts of said pictures to be brought into coincidence upon said binocular device to form an image which appears to an individual observer to be superimposed in different colors, a transparent reflecting screen movable into optic position between said picture holding devices when said auxiliary frame is moved into an extended position and said binocular device moved out of position between said picture holding devices to cause the light from corresponding parts of said pictures to be brought into coincidence upon said screen to form an image which appears to several observers to be superimposed in different colors, and means carried by said first mentioned frame for adjusting the focal distance between said picture holding devices and said transparent screen and binocular device.

MONTFORD MORRISON.